United States Patent
Weiner (10) Patent No.: US 10,763,962 B2
(45) Date of Patent: Sep. 1, 2020

(54) SECURED FIBER LINK SYSTEM

(71) Applicant: APRIORI NETWORK SYSTEMS, LLC, Bedminster, NJ (US)

(72) Inventor: Gary M. Weiner, Bedminster, NJ (US)

(73) Assignee: APRIORI NETWORK SYSTEMS, LLC., Bedminster, NJ (US)

(*) Notice: Subject to any disclaimer, the term of this patent is extended or adjusted under 35 U.S.C. 154(b) by 0 days.

(21) Appl. No.: 15/822,909

(22) Filed: Nov. 27, 2017

(65) Prior Publication Data
US 2018/0159619 A1    Jun. 7, 2018

Related U.S. Application Data

(63) Continuation-in-part of application No. 15/435,619, filed on Feb. 17, 2017, now Pat. No. 10,284,288.
(Continued)

(51) Int. Cl.
| | |
|---|---|
| *H04B 10/00* | (2013.01) |
| *H04B 10/08* | (2006.01) |
| *H04B 17/00* | (2015.01) |
| *H04B 10/25* | (2013.01) |
| *G02B 6/293* | (2006.01) |
| *H04B 10/079* | (2013.01) |
| *H04J 14/02* | (2006.01) |
| *H04J 14/04* | (2006.01) |
| *H04B 10/85* | (2013.01) |

(52) U.S. Cl.
CPC ......... *H04B 10/25* (2013.01); *G02B 6/29385* (2013.01); *H04B 10/0795* (2013.01); *H04B 10/85* (2013.01); *H04J 14/0227* (2013.01); *H04J 14/04* (2013.01)

(58) Field of Classification Search
USPC ............................................. 398/33, 40, 256
See application file for complete search history.

(56) References Cited

U.S. PATENT DOCUMENTS

| 4,000,416 A | 12/1976 | Goell |
| 4,062,618 A | 12/1977 | Steensma |

(Continued)

FOREIGN PATENT DOCUMENTS

WO    2018027267 A1    2/2018

OTHER PUBLICATIONS

"Risks and Dangers of Fibre Optic Cables", InfoGuard AG, Switzerland, pp. 1-9.
(Continued)

*Primary Examiner* — David C Payne
*Assistant Examiner* — Pranesh K Barua
(74) *Attorney, Agent, or Firm* — M&B IP Analysts, LLC (57) ABSTRACT

A system and method for securing communication over an optical fiber are disclosed. The system includes a transmit spatial multiplexer configured to couple a plurality of optical signals into respective ones of a plurality of spatial paths of an optical fiber, each of the spatial paths being able to carry an optical signal; wherein at least one of the plurality of optical signals is an optically modulated version of a desired sequence of information that is intended to be transferred over the optical fiber; and wherein at least one of the plurality of optical signals is an optical chaff signal; whereby a tap along the fiber cannot determine the transmitted desired sequence of information.

6 Claims, 7 Drawing Sheets

Related U.S. Application Data (60) Provisional application No. 62/427,186, filed on Nov. 29, 2016, provisional application No. 62/301,892, filed on Mar. 1, 2016, provisional application No. 62/296,897, filed on Feb. 18, 2016.

(56) References Cited

U.S. PATENT DOCUMENTS

| | | | |
|---|---|---|---|
| 4,134,642 A | 1/1979 | Kapron et al. | |
| 4,217,488 A * | 8/1980 | Hubbard | G02B 6/4469 |
| | | | 398/142 |
| 4,436,368 A | 3/1984 | Keck | |
| 4,973,169 A * | 11/1990 | Slonecker | G02B 6/274 |
| | | | 385/1 |
| 5,140,636 A | 8/1992 | Albares | |
| 5,166,821 A | 11/1992 | Huber | |
| 5,448,059 A | 9/1995 | Blank et al. | |
| 5,455,698 A | 10/1995 | Udd | |
| 5,559,623 A | 9/1996 | Einarsson | |
| 5,694,408 A | 12/1997 | Bott et al. | |
| 5,712,937 A | 1/1998 | Asawa et al. | |
| 5,757,912 A * | 5/1998 | Blow | H04L 9/0858 |
| | | | 380/256 |
| 6,160,614 A | 12/2000 | Unno | |
| 6,246,500 B1* | 6/2001 | Ackerman | H04B 10/505 |
| | | | 398/115 |
| 6,342,965 B1* | 1/2002 | Kinoshita | H01S 3/06754 |
| | | | 359/334 |
| 6,801,700 B2* | 10/2004 | MacChesney | G02B 6/02 |
| | | | 385/101 |
| 6,850,712 B1* | 2/2005 | Delavaux | H04B 10/2537 |
| | | | 398/183 |
| 7,327,914 B1 | 2/2008 | Kahn et al. | |
| 7,596,322 B2* | 9/2009 | Tomaru | H04L 9/0662 |
| | | | 380/255 |
| 7,613,396 B2* | 11/2009 | Maeda | H04B 10/70 |
| | | | 380/255 |
| 7,639,909 B2 | 12/2009 | Murshid et al. | |
| 8,184,989 B2* | 5/2012 | Maeda | H04L 9/0852 |
| | | | 380/256 |
| 8,538,272 B1* | 9/2013 | Robinson | H04B 10/2513 |
| | | | 398/158 |
| 8,644,362 B1* | 2/2014 | Lauer | H04J 13/0018 |
| | | | 375/141 |
| 8,798,455 B2 | 8/2014 | Frankel | |
| 9,007,681 B2 | 4/2015 | Zhu | |
| 9,008,507 B2* | 4/2015 | Winzer | H04B 10/2581 |
| | | | 398/26 |
| 9,766,407 B2 | 9/2017 | Weiner et al. | |
| 9,857,536 B2 | 1/2018 | Kopp et al. | |
| 2001/0024307 A1 | 9/2001 | Franco et al. | |
| 2002/0024691 A1* | 2/2002 | Kajita | H04B 10/079 |
| | | | 398/9 |
| 2002/0025041 A1* | 2/2002 | Tomita | H04L 9/0662 |
| | | | 380/256 |
| 2002/0085716 A1* | 7/2002 | Abdulkader | H04K 1/02 |
| | | | 380/205 |
| 2002/0191415 A1* | 12/2002 | Takei | H01S 3/067 |
| | | | 362/551 |
| 2003/0007215 A1 | 1/2003 | Snawerdt | |
| 2003/0128982 A1* | 7/2003 | Glingener | H04B 10/532 |
| | | | 398/65 |
| 2004/0156643 A1 | 8/2004 | Frederiksen et al. | |
| 2004/0184820 A1* | 9/2004 | Ohishi | H01S 3/06795 |
| | | | 398/200 |
| 2004/0208208 A1* | 10/2004 | Shin | H01S 5/4006 |
| | | | 372/32 |
| 2005/0105728 A1* | 5/2005 | Yamaoka | G06F 21/10 |
| | | | 380/202 |
| 2005/0244165 A1 | 11/2005 | Hofmeister | |
| 2005/0265727 A1* | 12/2005 | Glingener | H04J 14/06 |
| | | | 398/152 |
| 2006/0045525 A1* | 3/2006 | Lee | H04B 10/25752 |
| | | | 398/71 |
| 2006/0093376 A1* | 5/2006 | Mitchell | H04B 10/70 |
| | | | 398/183 |
| 2006/0115086 A1* | 6/2006 | Beausoleil | G06F 7/588 |
| | | | 380/263 |
| 2006/0188262 A1* | 8/2006 | Suematsu | H04B 10/077 |
| | | | 398/147 |
| 2007/0065155 A1* | 3/2007 | Luo | H04B 10/70 |
| | | | 398/141 |
| 2007/0285764 A1* | 12/2007 | Sugliani | H01S 3/302 |
| | | | 359/334 |
| 2008/0025511 A1* | 1/2008 | Fuse | H04K 1/02 |
| | | | 380/256 |
| 2008/0031637 A1* | 2/2008 | Tomaru | H04B 10/548 |
| | | | 398/188 |
| 2008/0310858 A1* | 12/2008 | Lu | H04B 10/296 |
| | | | 398/158 |
| 2009/0016736 A1* | 1/2009 | Beal | H04L 9/0852 |
| | | | 398/144 |
| 2010/0028008 A1* | 2/2010 | Nakajima | H04B 10/07955 |
| | | | 398/83 |
| 2010/0040380 A1* | 2/2010 | Lewin | G06E 3/00 |
| | | | 398/158 |
| 2010/0329671 A1 | 12/2010 | Ryf et al. | |
| 2010/0329693 A1* | 12/2010 | Chen | H04B 10/85 |
| | | | 398/147 |
| 2011/0076020 A1* | 3/2011 | Nilsson | H04B 10/0775 |
| | | | 398/65 |
| 2011/0170858 A1 | 7/2011 | Aguren | |
| 2011/0274435 A1 | 11/2011 | Fini et al. | |
| 2011/0279888 A1* | 11/2011 | Fini | H01S 3/094061 |
| | | | 359/334 |
| 2012/0076301 A1* | 3/2012 | Kanter | H04K 1/02 |
| | | | 380/256 |
| 2012/0177065 A1* | 7/2012 | Winzer | H04B 10/2581 |
| | | | 370/480 |
| 2012/0207470 A1 | 8/2012 | Djordjevic et al. | |
| 2012/0263466 A1 | 10/2012 | Djordjevic et al. | |
| 2012/0294625 A1* | 11/2012 | Dynes | H04L 7/0008 |
| | | | 398/155 |
| 2012/0314867 A1* | 12/2012 | Tomaru | H04L 9/08 |
| | | | 380/270 |
| 2013/0063809 A1 | 3/2013 | Nishihara et al. | |
| 2013/0077967 A1 | 3/2013 | Woodward et al. | |
| 2013/0121693 A1 | 5/2013 | Tanaka et al. | |
| 2013/0148963 A1 | 6/2013 | Cvijetic et al. | |
| 2013/0202292 A1* | 8/2013 | Sokolov | H04B 10/807 |
| | | | 398/34 |
| 2013/0236175 A1 | 9/2013 | Sethumadhavan et al. | |
| 2013/0308951 A1* | 11/2013 | Blumenthal | H04J 14/02 |
| | | | 398/83 |
| 2014/0003807 A1 | 1/2014 | Hamaguchi et al. | |
| 2014/0079395 A1* | 3/2014 | Effenberger | H04B 3/32 |
| | | | 398/66 |
| 2014/0153922 A1 | 6/2014 | Ryf et al. | |
| 2014/0168756 A1 | 6/2014 | Zhu | |
| 2014/0186033 A1* | 7/2014 | Winzer | H04B 10/2581 |
| | | | 398/39 |
| 2014/0294345 A1 | 10/2014 | Kopp et al. | |
| 2014/0307304 A1 | 10/2014 | Zhu | |
| 2014/0348506 A1* | 11/2014 | Nakamoto | H04J 14/0224 |
| | | | 398/65 |
| 2015/0117511 A1* | 4/2015 | Lyubomirsky | H04L 25/03057 |
| | | | 375/233 |
| 2015/0304051 A1* | 10/2015 | Yuan | H04B 10/70 |
| | | | 398/188 |
| 2015/0372763 A1* | 12/2015 | Wang | H04B 10/40 |
| | | | 398/81 |
| 2016/0018245 A1 | 1/2016 | Yamate et al. | |
| 2016/0036531 A1* | 2/2016 | Babic | H01S 5/041 |
| | | | 398/187 |
| 2016/0056889 A1* | 2/2016 | Le Taillandier De Gabory | H04L 25/14 |
| | | | 398/16 |
| 2016/0112119 A1 | 4/2016 | Vall-Llosera et al. | |

(56) References Cited

U.S. PATENT DOCUMENTS

| | | | | |
|---|---|---|---|---|
| 2016/0127073 | A1* | 5/2016 | Ashrafi | H04B 10/516 398/44 |
| 2017/0026175 | A1* | 1/2017 | Zhang | H04L 9/0852 |
| 2017/0104543 | A1* | 4/2017 | Taylor | H04B 10/516 |
| 2017/0279554 | A1* | 9/2017 | Lin | H04B 10/2503 |
| 2018/0159619 | A1 | 6/2018 | Weiner | |
| 2018/0259737 | A1* | 9/2018 | Lee | G02B 6/3598 |
| 2020/0083659 | A1 | 3/2020 | Reeves-Hall et al. | |

OTHER PUBLICATIONS

"Secure High-Speed Connectivity", Adva Optical Networking, Version Jul. 2015, pp. 1-6.

"Wavelogic Encryption Solution", ciena: the network specialist, Nov. 2015, pp. 1-5.

Almeshekah, "Using Deception to Enhance Security: A Taxonomy, Model, and Novel Uses," A Dissertation Submitted to the Faculty of Purdue University, West Lafayette, Indiana, Aug. 2015, pp. 1-171.

Barbosa, et al., "Untappable Key Distribution System: a One-Time-Pad Booster", Jul. 2015, pp. 1-13.

Deloitte, "Tapping of Fibre Networks", 2017, Deloitte Touche Tohmatsu Limited, pp. 1-10.

Hinderthur, "Layer 1 Encryption in WDM Transport Systems", Slideshow for ADVA Optical Networking, 2014, URL: https://www.slideshare.net/ADVAOpticalNetworking/layer-1-encryption-wdm-transport-systems.

Modi, et. al., "Integrating Signature Apriori Based Network Intrusion Detection System (NIDS) in Cloud Computing", 2nd International Conference on Communication, Computing & Security (ICCCS-2012), pp. 905-912.

Office of the Secretary of Defense (OSD), Office of Small Business Programs (OSBP), 18.1 Small Business Innovation Research (SBIR), Proposal Submission Instructions, pp. 1-8.

Richardson, et al., "Space Division Multiplexing in Optical Fibres", Southampton, UK, pp. 1-19.

Ritter, "Network Encryption", Adva Optical Networking, Sep. 2015, pp. 1-36.

Rozario, "Secure Communication Over Fiber Optic Networks", D Y Patil School of Engg. & Technology, India, Mar. 2016, pp. 1-27.

Simpson, "Advanced Alarmed PDS Technology", Network Integrity Systems, WESCO Distribution, Inc., Pittsburgh, PA., pp. 1-8.

Wu, et al., "Secure Communication in Fiber-Optic Networks", Chapter 11, Princeton, NJ, 2014, pp. 173-183. Emerging Trends in ICT Security. DOI: http://dx.doi.org/10.1016/B978-0-12-411474-6.00011-6.

Kaminow, et al., "Optical Fiber Telecommunications: Systems and Networks", 2013, Academic Press, Sixth Edition, pp. 460-461.

Dickson, "Secure Pipes: Changing the Expectation of Your Internet Service Providers", Jan. 2015, Copyright Frost & Sullivan, California, pp. 1-8.

Hayashi, et al., "125-um-Cladding 8-Core Multi-Core Fiber Realizing Ultra-High-Density Cable Suitable for O-Band Short-Reach Optical Interconnects", Sumitomo Electric Industries, Ltd.,Th5C.6.pdf, OFC Postdeadline Papers copyright OSA 2015, Japan, pp. 1-3.

IBM Analytics, White Paper, "The Awakening of Cyber-Threat Analysis: An Intelligence-Driven Solution to Security and Risk", IBM Corporation, Somers, NY, Copyright IBM Corporation 2015, pp. 1-20.

ID Quantique SA, "Securing Your Data in Transit for the Long Term", Switzerland, 2014, pp. 1-39.

ID Quantique White Paper, "Fibre Optic Networks: Your Weakest Link?", Version 1.0, Mar. 2011, Switzerland, pp. 1-9.

Kopp, et al., "Pitch Reducing Optical Fiber Array and Multicore Fiber for Space-Division Multiplexing", IEEE, 2013, TuC2.2 (Contributed), pp. 99-100.

Lalli, et al., "Modernized Intrusion Detection Using Enhanced Apriori Algorithm", International Journal of Wireless & Mobile Networks (IJWMN) vol. 5, No. 2, Apr. 2013, pp. 71-80.

Network Integrity Systems, Inc., "Enhancing the Deployment and Security of SIPRNET and JWICS Networks Using Intrinsic Fiber Monitoring", Conover, NC, Communications Supply Corporation, Clarksburg, MD, 2007, pp. 1-40.

Oyster Optics, Inc., "Securing Fiber Optic Communications against Optical Tapping Methods", Copyright 2002-2003 Oyster Optics, Inc., New York, pp. 1-20.

Umoh, et al., "The Vulnerability of Fiber-Optics Communication Systems: The Role of Optical Tapping", Journal of Information Engineering and Applications, ISSN 2224-5782 (print) ISSN 2225-0506 (online) vol. 4, No. 4, 2014, Nigeria, pp. 145-153.

The International Search Report and the Written Opinion of the International Searching Authority for PCT/US2019/060465, ISA/RU, Moscow, Russia.

* cited by examiner

SECURED FIBER LINK SYSTEM

CROSS-REFERENCE TO RELATED APPLICATIONS

This application claims the benefit of U.S. provisional application No. 62/427,186 filed on Nov. 29, 2016. This application is also a continuation-in-part of U.S. patent application Ser. No. 15/435,619 filed Feb. 17, 2017, which claims the benefit of U.S. provisional application No. 62/296,897, filed on Feb. 18, 2016 and of provisional application No. 62/301,892, filed on Mar. 1, 2016. The contents of each of the above-referenced applications are incorporated herein by reference.

TECHNICAL FIELD

The present disclosure relates generally to optical fiber cables, and more particularly to preventing tapping of optical fiber cables.

BACKGROUND

Intruders can tap into optical fiber transmission lines and steal information by either bending a segment or segments of the fiber or by stretching (i.e. tapering) a segment or segments of the fiber via application of heat to enable reading and interpreting the signal energy escaping from that fiber. While there are other methods of tapping information out of optical fibers, taps based on fiber bending or stretching are easy to implement, effective, and can be hard to detect. Tapping valuable data transmitted over the world wide optical fiber infrastructure is a threat to every major industry and government organization and, in particular, larger organizations utilizing multiple facilities. While these organizations may be able to secure optical fiber cables within their own facilities, they generally have much less control over the optical fiber cable links between those facilities.

The vulnerabilities of optical fibers to tapping and, in particular, tapping by bending or stretching of the fiber, leaves many organizations susceptible to data theft. Such data theft could lead to leaking of confidential information, thereby causing harm to the entity transporting data over optical fibers. In the business context, leaking of information, such as marketing strategies or developmental technologies may ultimately result in damage to profits. In the governmental context, leaking of information related to national security may endanger the lives or citizens. Existing solutions face challenges in detecting and preventing tapping of optical fibers.

It is generally believed that data encryption can secure data transmitted over a fiber link usually implemented using high level Advanced Encryption Standard (AES). This approach neglects, however, the fact that while the data payload is encrypted, the IP header information that guides the data packets around the internet is not, revealing both the source and destination of each packet, therefore revealing information about any message sent over the internet.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

The disclosed embodiments include a system for securing communication over an optical fiber. The system comprises: a transmit spatial multiplexer configured to couple a plurality of optical signals into respective ones of a plurality of spatial paths of an optical fiber, each of the spatial paths being able to carry an optical signal; wherein at least one of the plurality of optical signals is an optically modulated version of a desired sequence of information that is intended to be transferred over the optical fiber; and wherein at least one of the plurality of optical signals is an optical chaff signal; whereby a tap along the fiber cannot determine the transmitted desired sequence of information.

The disclosed embodiments also include a method for securing information transmitted over an optical fiber having a plurality of spatial paths. The method comprises: coupling each of a plurality of optical signals into at least a respective one of the plurality of spatial paths, wherein at least one of the plurality of optical signals is an optically modulated version of a desired sequence of information that is intended to be transferred over the optical fiber; and wherein at least one of the plurality of optical signals is an optical chaff signal.

The disclosed embodiments also include a terminal equipment for use in transmitting information over an optical fiber having a plurality of spatial paths each of which is able to carry an optical signal. The terminal equipment comprises: an optical coupler configured to couple each of a plurality of optical signals into at least a respective one of the plurality of spatial paths, wherein at least one of the optical signals is an optically modulated version of a desired sequence of information that is intended to be transferred over the optical fiber and at least one of the optical signals is a chaff signal; and a chaff signal generator supplying the chaff signal to the optical coupler, the chaff signal generator configured to extract amplified spontaneous emission from an optical amplifier substantially within the bandwidth of the optically modulated version of the desired sequence of information.

According to some disclosed embodiments there are three essential components to an untappable optical cable link system; a transmission medium, Chaff or Subterfuge signaling and compatibility with fiber networks. In an example embodiment, the transmission medium includes an optical fiber cable in which the transfer of information from a source (sender) is nearly transparent, high optical signal to noise ratio (OSNR) and low bit-error-rate (BER), to intended user(s) but is virtually opaque (low OSNR and high BER) to an intruder attempting to tap the cable anywhere along the line.

In another example embodiments, the chaff or subterfuge signaling provides a link opaque to intruders. Implemented at the terminal equipment, the interference data with the desired signal properties, discussed in more detail below, makes it virtually impossible for the intruders to separate the real signal from the combined data and interfering signals extracted by tapping the fiber cable. This method of launching interfering signals generated at the terminal(s) may be compatible with any current or future data transmission formats and protocol.

The compatibility with fiber networks provide cable technology and terminal equipment compatible with standard fiber cable infrastructure so that interfacing with the untappable cable is seamless to users of the technology.

According to some embodiments any fiber in which multiple, independent information bearing signals can propagate simultaneously can be utilized. Examples for such a fiber include multicore fiber (MCF) where individual signals can propagate in a set of parallel cores and any fiber, including multicore fibers, few mode fibers and multimode fibers, where spatial division multiplexing technology is employed. While the disclosed embodiments apply to all of these types of fibers, for simplicity the disclosure will focus on independent signals each propagating in a core of a multicore fiber. It is further assumed that there are at least one or more dedicated cores or channels used to transmit true signals in the multicore fiber. Furthermore, it is assumed that there is at least one chaff core or channel and at least one signal core or channel propagating in the multicore fiber. The multicore fibers can be made with a variety of core geometries. Such geometries can include concentric refractive index layers in a fiber creating concentric cores as well as individual cores arranged in a variety of cross sectional configurations, including: linear, circular, hexagonal, rectangular, and the like. Each core of a multicore fiber is capable of independently guiding a light signal along the length of the multicore fiber. The individual cores may be single mode or multimode at the signal wavelengths transmitted.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a secured fiber link system that can operate in concert with other measures for protecting transmitted data, such as data encryption, patrolling of data lines by guards, intrusion detection monitor sensors, and hardening of data lines by encasing them in concrete or steel conduits.

In an embodiment, the secured fiber link system is configured to allow transparent transmission of data to the intended user while simultaneously making the signal opaque or uninterpretable to an intruder anywhere along the entire link by overwhelming the intended information signal with interfering signal energy. In an embodiment, the secured fiber link system is compatible with any contemporary data rates, formats or telecommunications protocols, as well as signal wavelength provisioning, such as wavelength multiplexing (WDM). As such, the disclosed system may be agnostic to new equipment and protocols that will be developed in the future.

According to the disclosed embodiments, the secured fiber link system is configured to provide physical security of in-flight data propagating over a secured link by preventing the acquisition of true signal data by an intruder, without corruption by chaff signals. A true signal is a desired sequence of information that is intended to be transferred between legitimate users at both ends of the link. The chaff signals are generated at the terminal equipment whether or not the true data is encrypted. The chaff (subterfuge) signals are signals sent alongside the true signal to prevent intruders from tapping such legitimate signals from a fiber cable. Chaff signals may be applied to the link at one or both ends of the link. This security can be achieved by chaff signals generated at the terminal equipment, whether or not the true data is encrypted.

The system is configured to ensure that the intended recipient at the other end of the link receives the true data without the corrupting signal. Encrypting the data stream takes up transmission bandwidth and can introduce latency in the data transmission. An encrypted signal can be tapped by an intruder, but the secured fiber link system prevents the intruder from acquiring the true data in an unaltered form. Tapping of a fiber link is the act of changing a fiber by either putting physical force on a fiber cable (for example by bending the fiber) or by modifying the fiber by, for example, applying of heat, to allow a segment or segments of the fiber to be axially stretched (without breaking the fiber). Therefore, the energy propagating within the fiber is forced to leak out of the fiber for possible detection by an intruder (e.g., a hacker attempting to steal information being transmitted on the cable).

In an embodiment, the secured fiber link system can be used in conjunction with encryption to further secure data transmitted between terminals or can reduce the need for encryption which would in-turn free up considerable transmission bandwidth in the link.

The secured fiber link system sends a desired sequence of information in the form of a first "legitimate" or "true" signal (or set of signals) that is typically intended to be transferred between legitimate users at both ends of a link. At the terminal ends of the link, the chaff signal core(s) and the true signal core(s) can be monitored to detect changes in those signals that can result from the act of tapping the fiber. This would enable intrusion detection at the terminals of the fiber optic link system.

Figure 1:
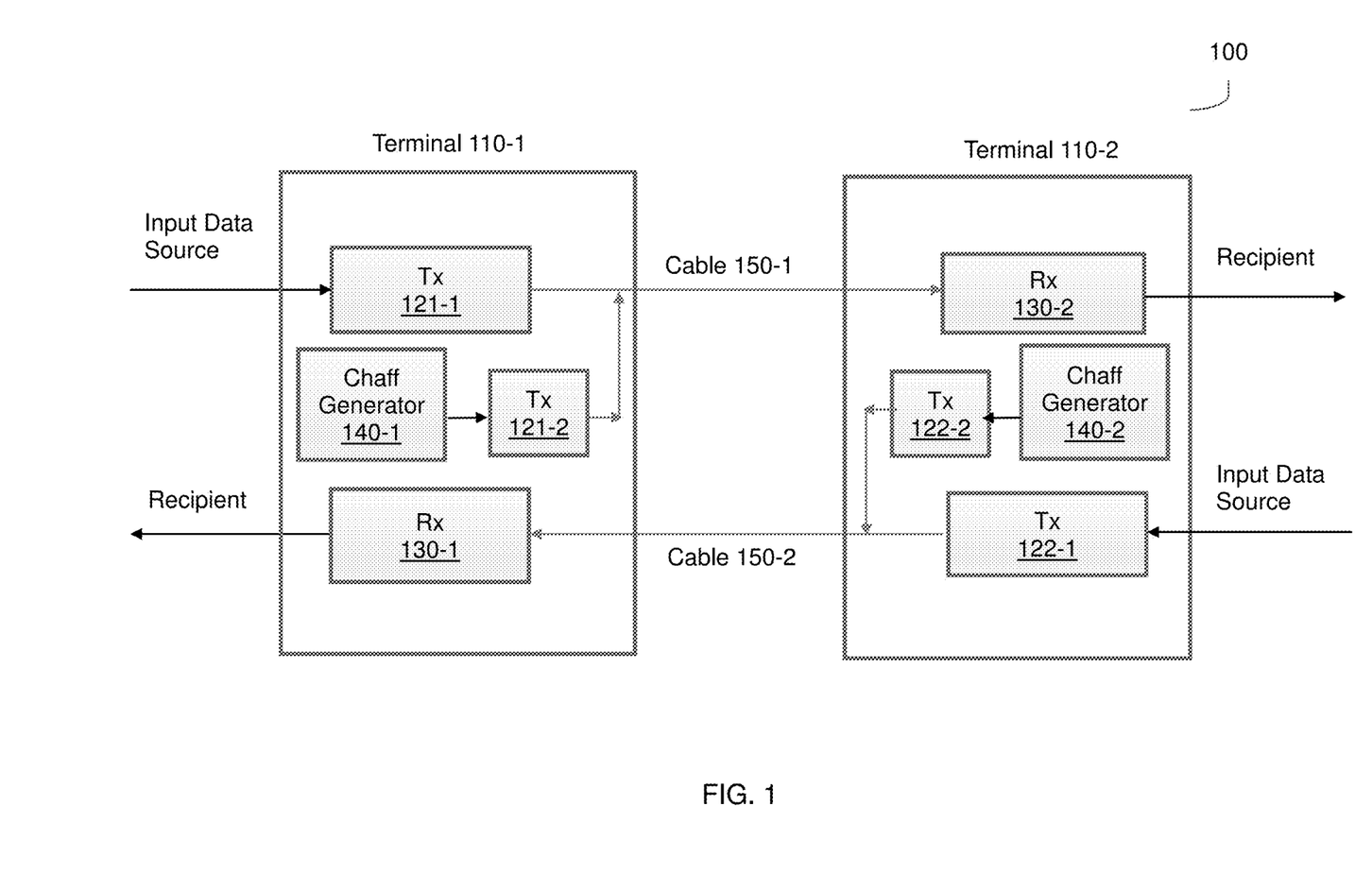
FIG. 1 is a block diagram of a secured fiber link system according to an embodiment.

FIG. 1 shows an example block diagram of a secured fiber link system 100 according to an embodiment. The system 100 includes transceiver terminals 110-1 and 110-2 connected via optical fiber cables 150-1 and 150-2 that can be multicore fiber, multimode or few mode fibers. Each terminal 110-1 or 110-2 includes transmitters 121-1 and 121-2 or 122-1 and 122-2, a receiver 130-1 or 130-2, and a chaff generator 140-1 or 140-2, respectively. Merely by way of example and without limitation on the disclosed embodiments, FIG. 1 will be discussed herein below with respect to transmitting signals from the terminal 110-1 and receiving the signals at the terminal 110-2. Signals may be equally transmitted from the terminal 110-2 and received at the terminal 110-1 without departing from the disclosed embodiments.

The terminal 110-1 transmits and receives signals via the optical fiber cables 150-1 and 150-2, respectively. In an embodiment, Chaff (interfering) signals are generated within the terminal 110-1 and is transmitted via the optical fiber cable 150-1 along with the true signal sent by the transmitter 121-1. The chaff signals may be generated within the chaff generator 140-1 or 140-2 and transmitted via the transmitter 121-2.

In an embodiment, the generated chaff signals are uncorrelated with the true data signals. The bandwidth of chaff signals is at least as wide as the bandwidth used for the true data signals. Further, the chaff signal is of sufficient optical strength to reduce the optical signal-to-noise-ratio (OSNR), or equivalently raise the bit error rate (BER), observed by an intruder, to a level whereby the information in the data signals tapped by the intruder is un-interpretable. At the receiver ends of the multicore fiber cable (150-1 or 150-2) the intended recipient will detect only the true signals transported transparently without interference from the chaff signals. Simultaneously, the chaff signals are available at the one or both ends of the link for intruder detection.

In an embodiment, the chaff and data signals are coupled selectively into the cores (or channels) of the multicore optical fiber at the transmitter end and selectively decoupled at the receiver. The coupling and decoupling of the true data and chaff signals into the individual channels of the multicore fiber is performed using a coupler, such as lensed fiber based coupler, tapered glass fiber coupler, a free space bulk optics coupler, and the like.

In an embodiment the optical fiber cables 150-1 and 150-2 are structured as multicore cables. Each core of a multicore fiber is capable of independently guiding a light signal along the entire length of the multicore fiber. The individual cores may be single mode or multimode at the signal wavelengths transmitted.

In a further embodiment, each of optical fiber cables 150-1 and 150-2 is constructed to have the following properties: transparent, high optical OSNR and low BER to intended recipients of the information, but is virtually opaque (low OSNR and high BER) to an intruder attempting to tap the cable. Different implementations of a multicore optical fiber cable are provided below.

The properties of the chaff signaling defenses the fiber cable from intruders. Such properties, discussed in more detail below, prevent the ability of the intruder to separate the true data signal from the combined true data and chaff signals extracted by tapping the fiber cable. This method of launching interfering signals generated at the terminal is compatible with any current or future data transmission formats and protocol. Further, the disclosed systems include optical fiber optical cables are compatible with standard fiber cable infrastructure, thus that interfacing with the untappable cable is seamless to users of the technology.

The secured fiber link system provides protection along the entire length of the link without the need for expensive guards or encasements making installation and security maintenance less expensive (especially on a long link), and increase in bandwidth available for transmitting data due to reduced dependence on data encryption for security.

It should be noted that only two terminals 110 and two optical fibers 150 are shown in FIG. 1 merely for simplicity purposes and without limitation on the disclosed embodiments. Additional terminals and/or optical fibers may be utilized without departing from the scope of the disclosure.

Figure 2A:
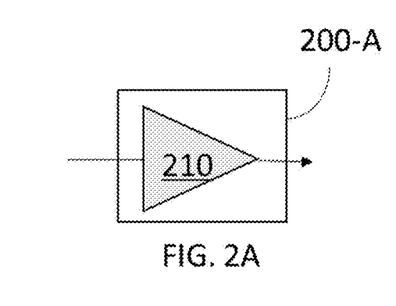
FIGS. 2A, 2B and 2C are block diagrams of a chaff generator using amplified spontaneous emission (ASE) structured according to various embodiments.

FIG. 2A is an example diagram of a chaff generator 200-A implemented according to an embodiment. In this embodiment, the chaff source includes an optical amplifier (OA) 210 and operates as an amplified spontaneous emission (ASE) generator. The OA 210 may be, but is not limited to, a semiconductor amplifier, a Raman amplifier, a doped fiber optic amplifier (e.g. Erbium doped) with no signal source as an input, and the like. The spontaneous emission from the OA 210 can be amplified to a high intensity.

Figure 2B:
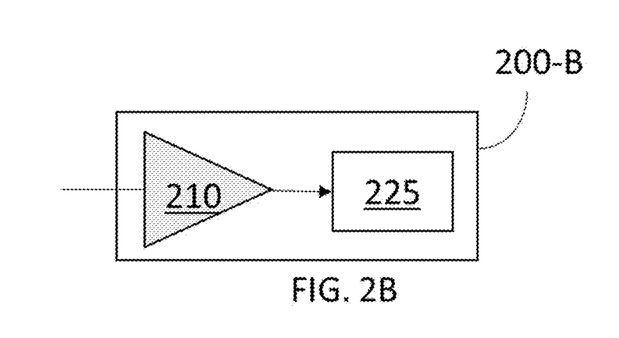
Figure 3:
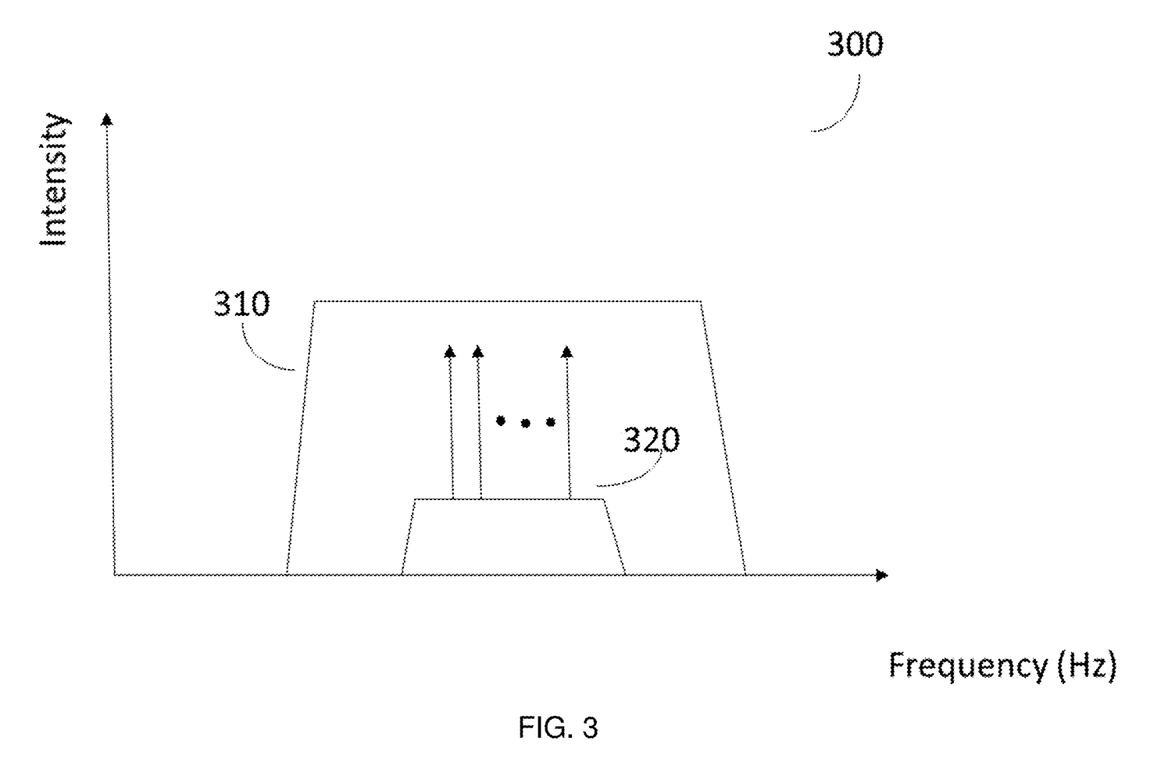
FIG. 3 is a plot of the spectrum of the ASE source with optional filter as compared to the spectrum of the data channels according to an embodiment.

FIG. 2B is an example diagram of a chaff generator 200-B implemented according to another embodiment. In this embodiment, the chaff source 200-B includes an optional optical filter 220 coupled to an OA 225. The optical filter 220 is located at the output stage of the chaff generator 200-B to flatten and limit the spectrum over a predefined frequency band. As shown in the ASE spectrum 310 of FIG. 3, the optical filter 220 flattens the output of the chaff source 200-B to at least cover the data signal spectrum 320.

Figure 2C:
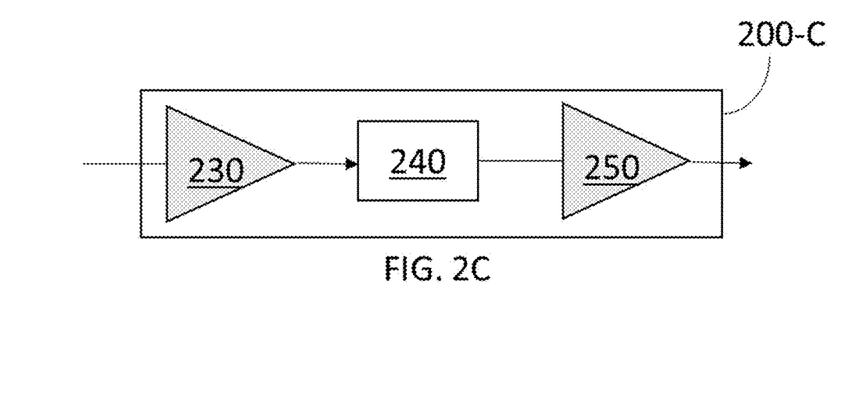

FIG. 2C an example diagram of a chaff generator 200-C implemented according to another embodiment. In this embodiment, a first optical amplifier 230 is coupled to an optical filter 240 which is coupled to a second optical amplifier 250. The optical amplifier 250 is the output the stage of the chaff generator 200-C and utilized the amplify the output signal, i.e., the chaff signal.

In another embodiment, the chaff signals can be made overwhelmingly strong so that the level of tapped optical energy exceeds the dynamic range of the detector in the intruder's tapping equipment. In this case, there may not be any need to structure the format of the chaff signals as their total power will overwhelm the tapping equipment.

According to various disclosed embodiments, a secured fiber link system may include a transmission medium and chaff signaling, and may be compatible with fiber networks. The transmission medium may be an optical fiber cable in which the transfer of information from a source (sender) is nearly transparent, having a high OSNR and BER, to intended user(s) but is virtually opaque (having low OSNR and high BER) to an intruder attempting to tap the cable anywhere along the line.

The OSNR of the data channel seen by the intended recipient is not degraded by the presence of chaff signals in other cores of the multicore fiber. The OSNR seen by the intended recipient is given by the ratio of the signal intensity detected in the data channel to the total noise power detected $$\text{OSNR} = P_{signal,Tx} / \text{ASE}_{total}; \quad \text{Equation 1}$$

where $P_{signal,Tx}$ is the signal power transmitted from the terminal equipment and $\text{ASE}_{total}$ is the total amplified spontaneous emission power generated over the link and detected at the receiver. The two quantities are inversely related, the higher the OSNR the lower the BER (and vice versa). For each data format, there is a threshold BER above which the signal information cannot be extracted. The purpose of the chaff in combination with the multicore fiber is to make sure that all along the fiber link, that the BER seen by an intruder is above this threshold.

Figure 4:
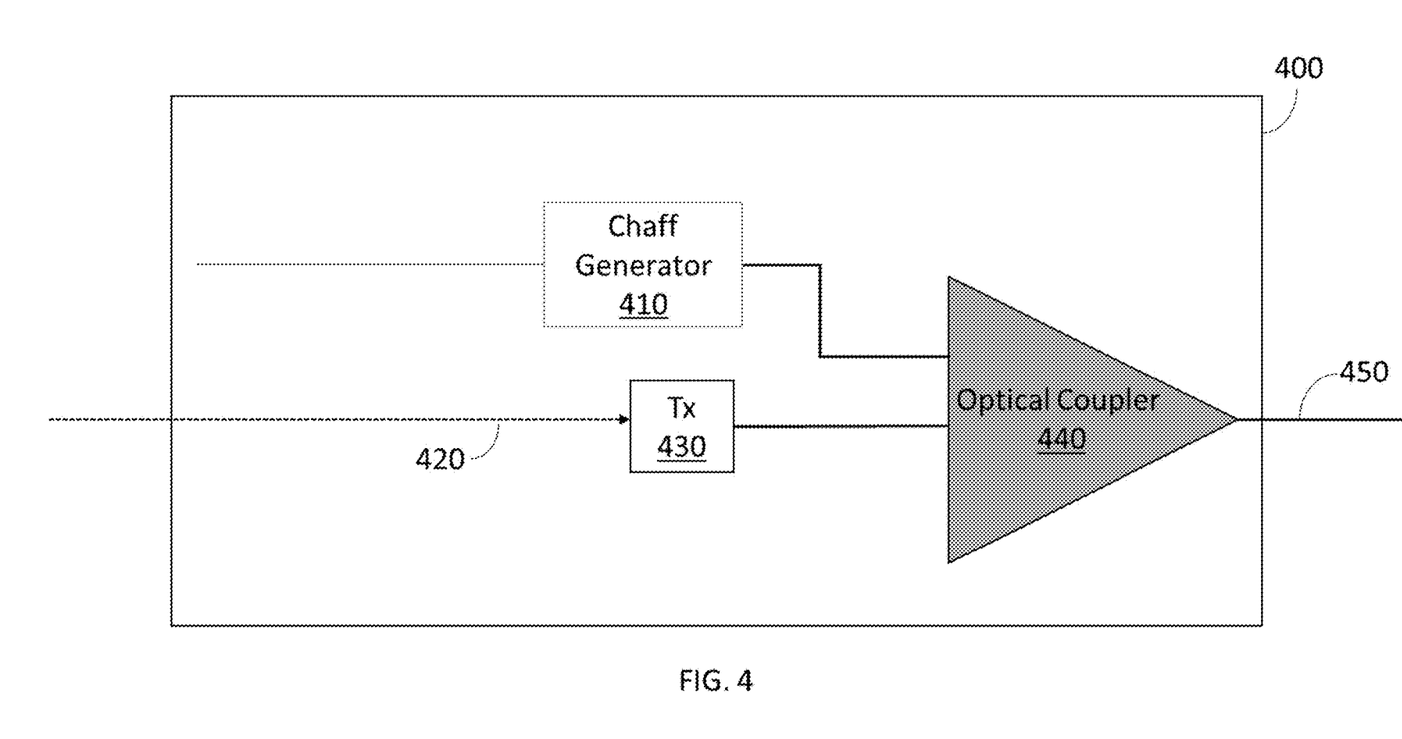
FIG. 4 is a block diagram of terminal equipment structured with one data channel and one or more chaff channels according to an embodiment.

FIG. 4 is a block diagram of the terminal equipment 400 structured according to an embodiment. The terminal equipment 400 includes a single data channel 420 and a single chaff channel and generator 410 used with a multicore fiber 450 that has at least two cores. The source of the data channel 420 is external to the terminal equipment 400. The transmitter (TX) 430 converts the electrical signal to an optical signal. The chaff generator 410 can be implemented as one of the basic chaff sources 200-A, 200-B, or 200-C as shown in FIGS. 2A through 2C. The OSNR seen by an intruder tapping into the fiber cable is given by:

$$OSNR_{tap} = \frac{\alpha_{signal}\rho_{signal}P_{signal,Tx}}{\alpha_{chaff}\rho_{chaff}ASE_{chaff}};\quad\text{Equation 2}$$

where $\alpha_{signal}$ and $\alpha_{chaff}$ are the attenuations suffered by the data signal and chaff respectively between the terminal equipment and the position at which the fiber cable was tapped. $\rho_{signal}$ and $\rho_{chaff}$ are the out-coupling coefficients for the signal and chaff at the tap location. $P_{signal,Tx}$ is the signal power transmitted from the terminal equipment and $ASE_{chaff}$ is the power in the chaff signal generated at the terminal equipment.

Figure 5:
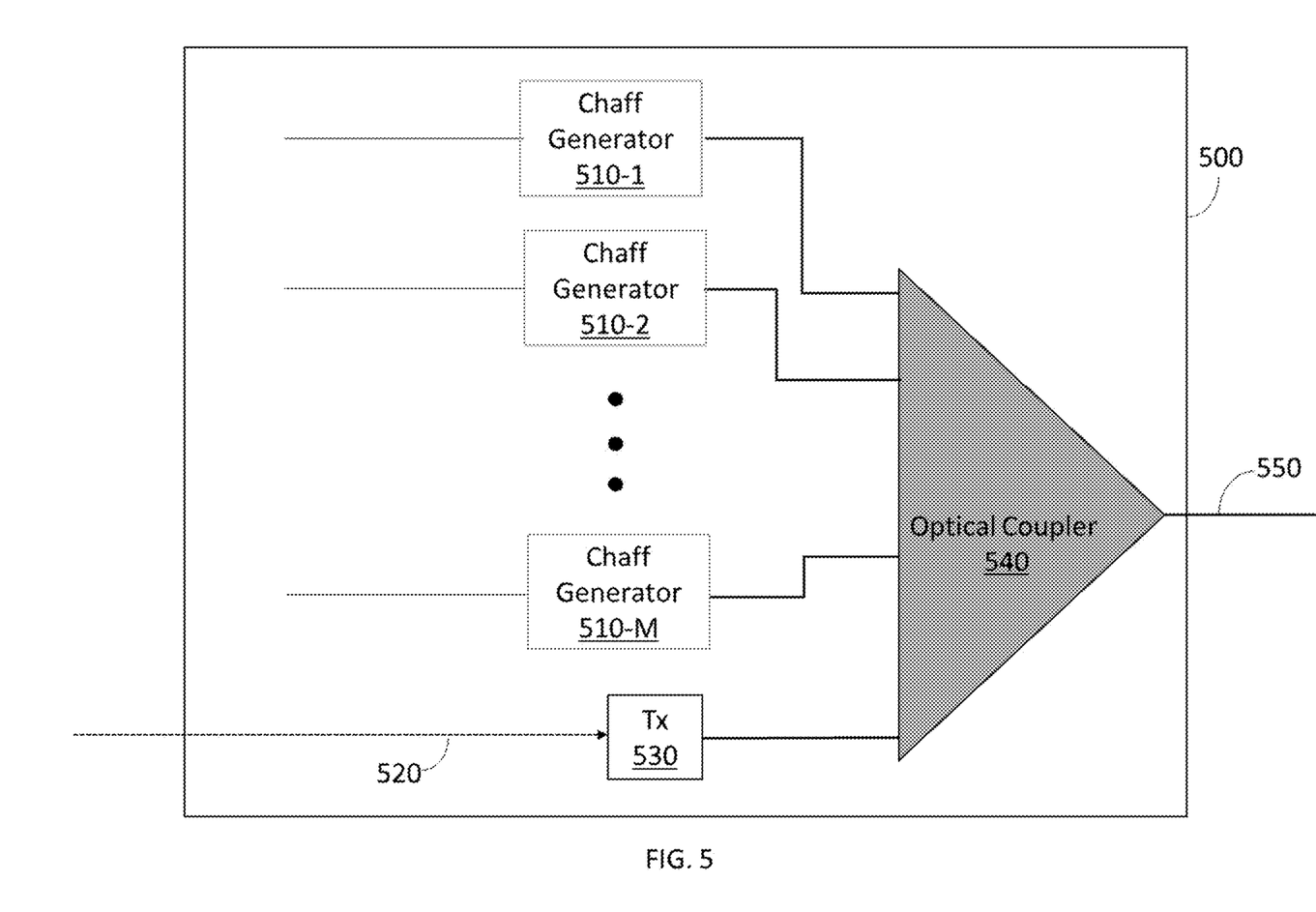
FIG. 5 is a block diagram of the terminal equipment structured with one data channel and one or more chaff channels according to an embodiment.

FIG. 5 is a block diagram of the terminal equipment 500 structured according to an embodiment. The terminal equipment 500 includes one or more data channels 420 and one or more chaff channels and generators 510-1 through 510-M where M is the number of total chaff channels. The source of the data channel 520 is external to the terminal equipment 500. The transmitter (TX) 530 converts the electrical signal to an optical signal. The chaff generators 510-1 through 510-M can be implemented as any one of the basic chaff sources 200-A, 200-B, or 200-C as shown in FIGS. 2A through 2C.

The terminal equipment 500 may include one or more data channels (N) and chaff channels and generators (M) where M and N are both integers greater than or equal to 1. Further, the number of total channels in the multicore fiber 550 is at least the sum of the data and chaff channels (N+M). The OSNR is inversely dependent on the number of chaff channels (1/M) as shown in the following equation:

$$OSNR_{tap} = \frac{\alpha_{signal}\rho_{signal}P_{signal,Tx}}{M\alpha_{chaff}\rho_{chaff}ASE_{chaff}};\quad\text{Equation 3}$$

where the $\alpha_{signal}$ and $\alpha_{chaff}$ are the attenuations suffered by the data signal and chaff respectively between the terminal equipment at which they were each generated and the position at which the fiber cable was tapped. M is the number of independent chaff channels and $\rho_{signal}$ and $\rho_{chaff}$ are the out-coupling coefficients for the signal and chaff at the tap location. $P_{signal,Tx}$ is the signal power transmitted from the terminal equipment and $ASE_{chaff}$ is the power in the chaff signal generated at the terminal equipment. When there are multiple data channels (N>1), the OSNR value of each data channel 520 is the same as for a single data channel since it is assumed that the data channels are also independent of each other.

Figure 6:
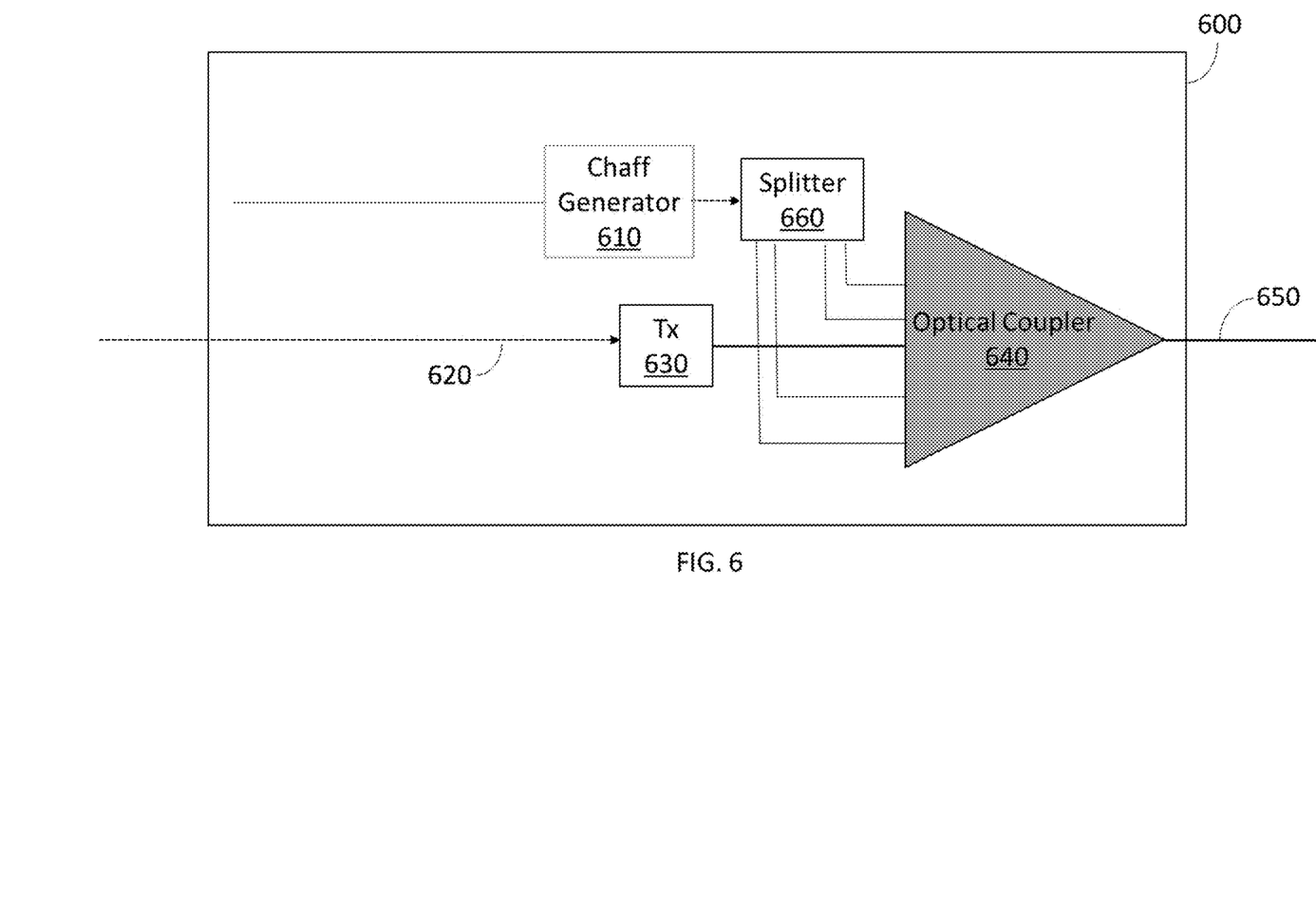
FIG. 6 is a block diagram of terminal equipment structured with one data channel and one chaff channel split into multiple multicore fiber channels according to an embodiment.

FIG. 6 is a block diagram of the terminal equipment 600 structured according to another embodiment. In this embodiment, the terminal equipment 600 includes one or more data channels (N≥1) and one chaff channel generator (M=1) realized by the chaff generator 610. The chaff generator 610 can be implemented as one of the basic chaff sources 200-A, 200-B, or 200-C as shown in FIGS. 2A through 2C. In this embodiment, the output of the chaff generator 610 is split, by a splitter 660, into a number of individual chaff channels. In this embodiment, all of the individual chaff channels are coherent. Thus, when determining an OSNR value as seen by an intruder tapping the fiber, the chaff channels are coherently combined. That is, the chaff channels add in amplitude, but square in intensity. Each chaff channel is divided into M equal paths, the power in each path is 1/M times the total generated chaff (ASE) signal and correspondingly the amplitude of each chaff channel is 1/sqrt(M) times the amplitude of the generated chaff channel. The OSNR for this case as seen by an intruder tapping the fiber is, $$OSNR_{tap} = \frac{\alpha_{signal}\rho_{signal}P_{signal,Tx}}{M\alpha_{chaff}\rho_{chaff}ASE_{chaff}};\quad\text{Equation 4}$$

Figure 7:
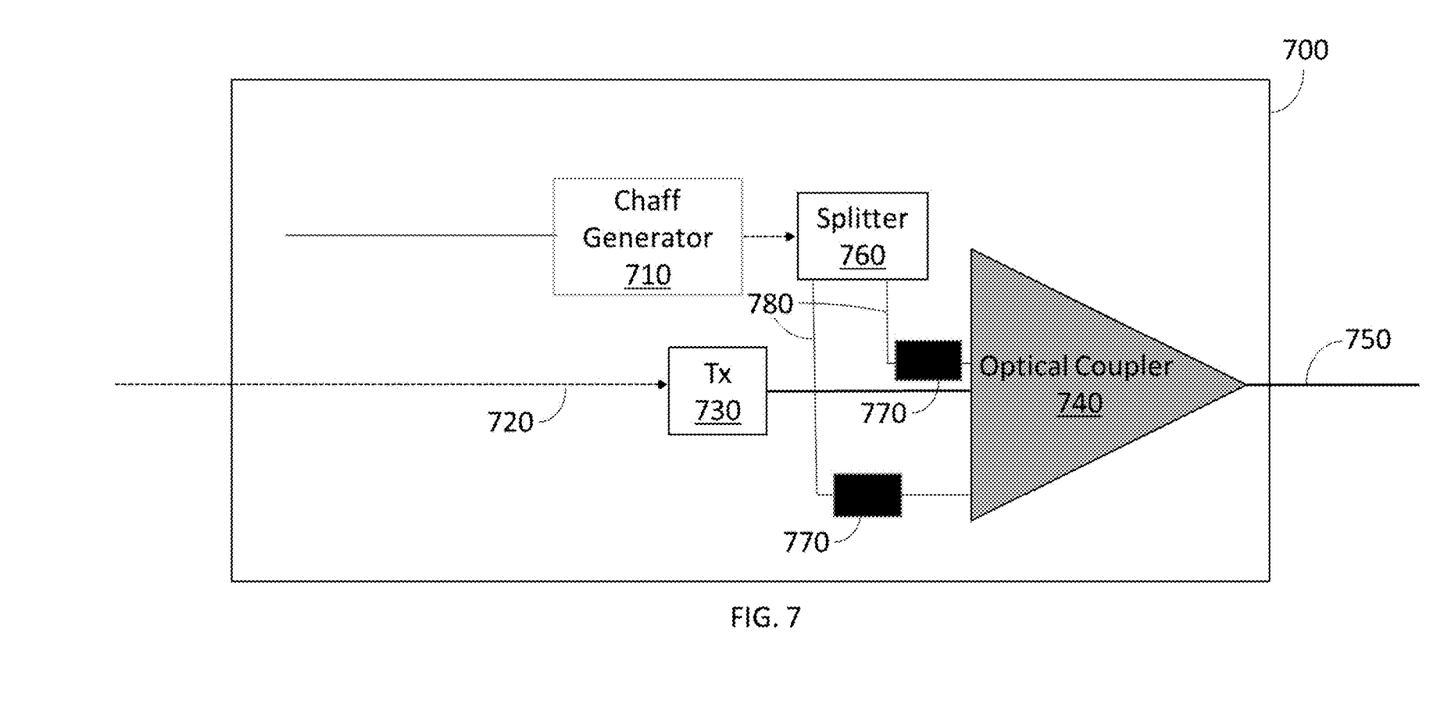
FIG. 7 is a block diagram of terminal equipment structured with one data channel and one chaff channel split into multiple multicore fiber channels with delay lines according to an embodiment.

FIG. 7 is a block diagram of the terminal equipment 700 structured according to another embodiment. In this embodiment, the terminal equipment 700 includes one or more data channels (N≥1) and one chaff channel (M=1) realized by the chaff generator 710. The chaff generator 710 can be implemented as one of the basic chaff sources 200-A, 200-B, or 200-C as shown in FIGS. 2A through 2C. In this embodiment, optical delay lines 780 applied to the outputs from the splitter 760 make the individual chaff channels incoherent with each other. The delay lines 780 may include delay line modules 770 to implement the delays along the delay lines 780. The differences between the delay lines 780 will de-correlate the chaff signals in the multicore fiber link 750. This allows to emulate multiple independent chaff signals using a single source (generator 710). Since the correlation length can be made to be kilometers long, the making of an active optical cable whose length is comparable to the length of the delay lines used to de-correlate the chaff channels can be cost effective.

As discussed above, the secured optical fiber system utilizes multicore optical fibers. In such fibers, individual signals can propagate in a set of parallel cores and any fiber, including multicore fibers, few mode fibers and multimode fibers, where spatial division multiplexing technology is employed.

Multicore fibers can be made with a variety of core geometries including, but not limited to, concentric refractive index layers in a fiber creating concentric cores as well as individual cores arranged in a variety of cross sectional configurations. These configurations include, but are not limited to: linear, circular, hexagonal, rectangular, and the like.

The individual cores of a multicore fiber used in the secured fiber link system can be identical to each other or can be different from one another. Specifically, here it is considered that the cores are selected from among two basic types, one that is bend sensitive and one that is bend insensitive. The bend insensitive cores can be made using refractive index trenches or rings of air-cores surrounding the signal carrying core that will limit the amount of light that can escape the fiber when it is bent. A multicore fiber can be made with cores of one type of fiber described or can be made of combinations of both types.

In an embodiment, the center core of a multicore fiber (carrying the true signal) is a bend sensitive core and the outer core(s) carrying the chaff signals are of the bend insensitive type. Upon tapping by an intruder, the energy in the signal channel will drop and is detectable by a monitor at the terminal end(s) of the link. In a similar embodiment, if there are M signal cores (M≥1) and N chaff cores (N≥1) in the multicore fiber (total cores in MCF≥M+N), then the M signal cores can be of the bend sensitive type and the N chaff cores can be of the bend insensitive type.

In another embodiment, the center core of the multicore fiber (signal) is bend insensitive and the outer core(s) carrying chaff signal(s) are of the bend sensitive type. This will improve the OSNR advantage of the secured fiber link system when tapped by an intruder as more energy leaks out of the chaff cores than the true signal core. In a similar embodiment, if there are M signal cores (M≥1) and N chaff cores (N≥1) in the multicore fiber (total cores in MCF≥M+N), then the M signal cores can be of the bend insensitive type and the N chaff cores can be of the bend sensitive type.

The chaff signals should be totally uncorrelated with the true signal and have a bandwidth at least as wide as that used for the data signals used over the fiber link. The chaff signals should also be of sufficient strength to reduce the OSNR or equivalently raise the BER for an intruder tapping the fiber link.

According to various disclosed embodiments, the transmission medium may include, but is not limited to, any fiber in which multiple, independent information bearing signals can propagate simultaneously. Examples include, but are not limited to, multicore optical fibers where individual signals can propagate in a set of parallel cores and any fiber, including multicore fibers, few mode fibers and multimode fibers, where spatial division multiplexing technology is employed. While the principles of the disclosed embodiments may apply to these types of fibers, for the sake of simplicity, the disclosure is discussed with respect to independent signals each propagating in a core of a multicore fiber. It is further assumed that there are at least one or more dedicated channels used to transmit signals in the multicore fiber. Furthermore, it is assumed that there is at least one chaff channel and at least one signal channel propagating in the multicore fiber.

Therefore, if the anti-tapping system is utilized according to various disclosed embodiments, then the resulting protection will be the same regardless of how an intruder applies their fiber bending or stretching mechanism. For the current secured system, it is assumed that the chaff and true signal channels can each be coupled selectively into the chaff and true signal channels of the fiber at the transmitter end and selectively coupled out at the other end (receiver) of the link with an appropriate coupler. Such couplers include lensed fiber based couplers, tapered glass fiber couplers, polymer based couplers, and free space bulk optics couplers.

In a typical embodiment, the optical fiber medium should have properties that both maximize the effectiveness of the anti-tapping capability of the system and do not inhibit the legitimate information transfer between system users: The relevant properties of the fiber are out-coupling efficiency (dB) of the true and chaff channels via bending or stretching, attenuation of the chaff and true signal channels (dB/m) along the fiber link, and cross-talk between the chaff and true signal channels (dB). The various disclosed embodiments include involves the relative out-coupling of the chaff signal (s) energy as compared to the true signal(s) energy at the point of tapping along the link and the corresponding impact on the OSNR as seen by an intruder. The strength of the true and chaff signal(s) depends on the strength of the corresponding sources, the attenuation of the signals in the fiber from the source to the point along the fiber link where the tapping occurs and the out-coupling efficiency for each signal at the point of tapping (as summarized for different embodiments in equations 2, 3 and 4). The essential point is that the total chaff energy extracted by an intruder from the fiber link at the point of tapping should be sufficiently strong compared to the true signal energy such that the OSNR observed by the intruder is sufficiently low so that the bit error rate will be sufficiently high to prevent the intruder from extracting useful information from the true signal. Simultaneously the OSNR observed by the indented recipient should be sufficiently high so that the intended recipient can extract all information from the true signal.

If the crosstalk, $\gamma$(dB/m) being the crosstalk per unit length of fiber between chaff and true signal channels, is significant then this can severely limit the data transfer along the legitimate signal channel. It may also be easier to tap the fiber as both signal and chaff channels will contain signal information.

If crosstalk is low between the signal and chaff channels, then the secured fiber link system will be the most effective. Thus, crosstalk should be minimized in the fiber.

In an embodiment, station reflectors may be used at the terminations of the multicore fiber cores that carry the chaff signals so that generated chaff generated signal at the central office can be "reused" in the cable. This may negate the need for to generate a chaff signal at the recipient's premises, reducing the equipment needed at the customer's premises. This may be advantageous for fiber-to-the-home, where this embodiment minimizes the equipment required at the customer's home. This aids the network management in that all chaff signal generation can be at the central office making repairs easier and less invasive to a home customer. A reflector can be placed at the end of the multicore fiber link that only reflects the chaff channels and does not reflect the true signal core. An alternative is to use a multichannel fanout coupler and then to terminate the individual chaff fanout channels with connectors that have a reflector on them that will reflect the amplified spontaneous emission energy back through the multichannel fanout coupler and back into the multicore fiber. The signal channel(s) will not be terminated with a reflector.

In an embodiment, one or more of the non-true-signal carrying cores can be used to carry light that will be used to transmit power from the central office to the receive station where a photodetector will convert the optical energy into electrical energy that can be used to run the receive station or be stored in a battery if one is used at the receiver. This will enable the capability of the phone system that was in place for many years in that the phone system was self-powered, independent of the local power company.

It should be noted that the various teachings herein are described with respect to particular units of measurement merely for simplicity purposes and without limitation on the disclosed embodiments.

It should be noted that the disclosed embodiments can be utilized in alternatively or in conjunction with existing or future fiber cables and/or security systems for preventing tapping or other tampering with fiber cables without departing from the scope of the disclosure.

For any control electronics required for the terminal equipment, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for securing communication over an optical fiber, comprising:
    a transmit spatial multiplexer configured to couple a plurality of optical signals into respective ones of a plurality of spatial paths of an optical fiber, each of the spatial paths being able to carry an optical signal;
    wherein at least one of the plurality of optical signals is an optically modulated version of a desired sequence of information that is intended to be transferred over the optical fiber;
    wherein at least one of the plurality of optical signals is an optical chaff signal;
    whereby a tap along the fiber cannot determine the transmitted desired sequence of information;
    wherein at a tap formed at any location along the fiber a signal-to-noise ratio is less than the required signal-to-noise ratio for a receiver at the tap location to achieve substantially error-free recovery of the desired sequence of information,
    wherein noise in the signal-to-noise ratio is a combination of optical power, within the optical frequency range substantially occupied by the optically modulated version of a desired sequence of information, of each optical signal that is coupled by the transmit spatial multiplexer to the optical fiber that is a chaff signal; and
    wherein signal in the signal-to-noise ratio is an optical power of the at least one optical signal that is coupled by the transmit spatial multiplexer to the optical fiber that is not an optical chaff signal.

2. A system for securing communication over an optical fiber, comprising:
    a transmit spatial multiplexer configured to couple a plurality of optical signals into respective ones of a plurality of spatial paths of an optical fiber, each of the spatial paths being able to carry an optical signal;
    wherein at least one of the plurality of optical signals is an optically modulated version of a desired sequence of information that is intended to be transferred over the optical fiber;
    wherein at least one of the plurality of optical signals is an optical chaff signal;
    whereby a tap along the fiber cannot determine the transmitted desired sequence of information;
    wherein at a tap formed at any location along the fiber a signal-to-noise ratio is less than a theoretically minimum required signal-to-noise ratio for any receiver at the tap location to achieve substantially error-free recovery of the desired sequence of information,
    wherein noise in the signal-to-noise ratio is a combination of optical power, within the optical frequency range substantially occupied by the optically modulated version of a desired sequence of information, of each optical signal that is coupled by the transmit spatial multiplexer to the optical fiber that is a chaff signal; and
    wherein signal in the signal-to-noise ratio is an optical power of the at least one optical signal that is coupled by the transmit spatial multiplexer to the optical fiber that is not an optical chaff signal.

3. A system for securing communication over an optical fiber, comprising:
    a transmit spatial multiplexer configured to couple a plurality of optical signals into respective ones of a plurality of spatial paths of an optical fiber, each of the spatial paths being able to carry an optical signal;
    wherein at least one of the plurality of optical signals is an optically modulated version of a desired sequence of information that is intended to be transferred over the optical fiber;
    wherein at least one of the plurality of optical signals is an optical chaff signal;
    whereby a tap along the fiber cannot determine the transmitted desired sequence of information;
    wherein an optical power of the optical chaff signal within an optical frequency range substantially occupied by an optically modulated version of a desired sequence of information is such that the ratio of an optical power of the optically modulated version of a desired sequence of information power to an optical power of the optical chaff signal power that is couplable out of the fiber at a tap formed therein at any location along the fiber is smaller than a required signal-to-noise ratio to achieve error-free detection of the desired sequence of information by a receiver at the tap location.

4. A system for securing communication over an optical fiber, comprising:
   a transmit spatial multiplexer configured to couple a plurality of optical signals into respective ones of a plurality of spatial paths of an optical fiber, each of the spatial paths being able to carry an optical signal;
   wherein at least one of the plurality of optical signals is an optically modulated version of a desired sequence of information that is intended to be transferred over the optical fiber;
   wherein at least one of the plurality of optical signals is an optical chaff signal;
   whereby a tap along the fiber cannot determine the transmitted desired sequence of information;
   wherein an optical power of the optical chaff signal within an optical frequency range substantially occupied by an optically modulated version of a desired sequence of information is such that the ratio of an optical power of the optically modulated version of a desired sequence of information power to an optical power of the optical chaff signal power that is couplable out of the fiber at a tap formed therein at any location along the fiber is smaller than a theoretical minimum signal-to-noise ratio to achieve error-free of the desired sequence of information by a receiver at the tap location.

5. A method for securing information transmitted over an optical fiber having a plurality of spatial paths, comprising:
   coupling each of a plurality of optical signals into at least a respective one of the plurality of spatial paths;
   wherein at least one of the plurality of optical signals is an optically modulated version of a desired sequence of information that is intended to be transferred over the optical fiber;
   wherein at least one of the plurality of optical signals is an optical chaff signal and;
   wherein optical power of the at least one optical chaff signal when coupled to its optical path is such that at a tap at any point along the optical fiber a signal representing the optically modulated version of the desired sequence of information that is sufficiently strong to enable determination therefrom of the desired sequence of information cannot be obtained due to interference caused by the resultant presence of the optical chaff signal at the tap point.

6. A method for securing information transmitted over an optical fiber having a plurality of spatial paths, comprising:
   coupling each of a plurality of optical signals into at least a respective one of the plurality of spatial paths;
   wherein at least one of the plurality of optical signals is an optically modulated version of a desired sequence of information that is intended to be transferred over the optical fiber;
   wherein at least one of the plurality of optical signals is an optical chaff signal and;
   wherein at least two of the plurality of optical signals are optical chaff signals each having a respective power, and wherein a combination of the optical powers of the at least two optical chaff signals when coupled to their respective optical paths is such that at a tap at any point along the optical fiber a signal representing the optically modulated version of the desired sequence of information that is sufficiently strong to enable determination therefrom of the desired sequence of information cannot be obtained due to interference caused by the resultant presence of the optical chaff signals at the tap point.

* * * * *